(12) United States Patent
Sung et al.

(10) Patent No.: US 8,449,852 B1
(45) Date of Patent: May 28, 2013

(54) DIESEL OXIDATION CATALYSTS, SYSTEMS AND METHODS OF TREATMENT

(75) Inventors: Shiang Sung, New York, NY (US);
Stanley A. Roth, Yardley, PA (US);
Torsten W. Mueller-Stach, Hannover (DE); Attilio Siani, Hannover (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 13/309,265

(22) Filed: Dec. 1, 2011

(51) Int. Cl.
*B01D 53/94* (2006.01)
*B01J 23/14* (2006.01)
*B01J 23/34* (2006.01)
*B01J 23/08* (2006.01)
*B01J 23/38* (2006.01)
*B01J 23/62* (2006.01)
*B01J 23/656* (2006.01)
*B01J 37/00* (2006.01)
*F01N 3/28* (2006.01)

(52) U.S. Cl.
USPC .......... 423/213.5; 60/299; 502/325; 502/324; 502/352; 502/355; 502/514; 502/527.12; 502/527.13

(58) Field of Classification Search
USPC ............ 502/325, 324, 352, 355, 514, 527.12, 502/527.13; 423/213.5; 60/299
See application file for complete search history.

(56) References Cited

U.S. PATENT DOCUMENTS

| | | |
|---|---|---|
| 5,064,803 A | 11/1991 | Nunan |
| 5,306,684 A | 4/1994 | Itoh et al. |
| 6,040,265 A | 3/2000 | Nunan |
| 6,132,694 A | 10/2000 | Wood et al. |
| 6,326,329 B1 | 12/2001 | Nunan |
| 6,521,196 B2 * | 2/2003 | Campbell et al. .......... 423/242.1 |
| 6,585,944 B1 | 7/2003 | Nunan et al. |
| 6,790,432 B2 * | 9/2004 | Ruettinger et al. .......... 423/656 |
| 7,041,622 B2 | 5/2006 | Nunan |
| 7,485,270 B2 | 2/2009 | Ywigg et al. |
| 7,563,746 B2 | 7/2009 | Nunan |
| 7,906,449 B2 * | 3/2011 | Ando et al. .................... 502/66 |
| 8,057,767 B1 * | 11/2011 | Qi et al. ...................... 423/213.2 |
| 2003/0140620 A1 | 7/2003 | Shigapov et al. |
| 2003/0170160 A1 | 9/2003 | Morita et al. |
| 2006/0030481 A1 * | 2/2006 | LaBarge et al. ............... 502/324 |
| 2007/0134145 A1 | 6/2007 | Strehau et al. |
| 2007/0238605 A1 | 10/2007 | Strehlau et al. |

FOREIGN PATENT DOCUMENTS

| | | |
|---|---|---|
| EP | 0781592 | 7/1997 |
| WO | WO-2006/120013 | 11/2006 |
| WO | WO-2007/093325 | 8/2007 |
| WO | WO-2008/046920 | 4/2008 |

\* cited by examiner

*Primary Examiner* — Timothy Vanoy
(74) *Attorney, Agent, or Firm* — Melanie L. Brown

(57) ABSTRACT

Diesel oxidation catalysts comprising a first washcoat layer including a platinum group metal impregnated on a promoted non-zeolitic support are described. The promoter is one or more of tin, manganese, indium, group VIII metals. Methods of making and using the diesel oxidation catalyst, including emissions treatment systems, are also described.

29 Claims, 13 Drawing Sheets

DIESEL OXIDATION CATALYSTS, SYSTEMS AND METHODS OF TREATMENT

TECHNICAL FIELD

Diesel Oxidation Catalysts (DOCs) for diesel engine exhaust emissions systems and methods for their manufacture and use are disclosed. Specific embodiments are directed to diesel oxidation catalysts comprising one or more of tin and manganese as activity promoters.

BACKGROUND

Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of NOx.

Oxidation catalysts that contain platinum group metals, base metals and combinations thereof, are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts (DOCs), which are placed in the exhaust of diesel engines to treat the exhaust before it vents to the atmosphere. In addition to the conversions of gaseous HC, CO and particulate matter, oxidation catalysts that contain platinum group metals (which are typically dispersed on a refractory oxide support) also promote the oxidation of nitric oxide (NO) to $NO_2$. The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The SOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of TPM.

As emissions regulations become more stringent, there is a continuing goal to develop diesel oxidation catalyst (DOC) systems that provide improved performance, for example, light-off performance. There is also a goal to utilize components of DOCs, for example, the zeolites and palladium, as efficiently as possible.

SUMMARY

One or more embodiments of the invention are directed to catalytic articles comprising a substrate. The substrate has a first washcoat layer comprising a first platinum group metal comprising platinum impregnated on non-zeolite support promoted with a promoter. The promoter is selected from the group consisting of tin, manganese, indium, group VIII metal and combinations thereof.

In some embodiments, the catalytic article further comprises a second washcoat layer comprising a second platinum group metal on a support. In detailed embodiments, less than or equal to about 10% of the total platinum group metal is in the second washcoat layer. In specific embodiments, one or more of the first washcoat layer and the second washcoat layer further comprises a zeolite. In one or more embodiments, both the first washcoat layer and the second washcoat layer are substantially free of zeolite.

Some embodiments further comprise an undercoat washcoat layer comprising substantially no platinum group metal. The undercoat washcoat layer positioned between the substrate and the first washcoat layer.

In detailed embodiments, the promoter is in solid solution with the non-zeolite support. In some embodiments, the non-zeolite support is alumina. In some embodiments, the first platinum group metal comprises a mixture of platinum and palladium. In one or more embodiments, the promoter is present in an amount up to about 50% by weight.

In detailed embodiments, the promoted non-zeolite support is promoted with manganese, indium and iridium. In some embodiments, the promoter comprises manganese in an amount up to about 1 $g/in^3$, iridium in an amount up to about 0.01 $g/in^3$ and indium in an amount up to about 0.1 $g/in^3$. In detailed embodiments, the promoter comprises less than or equal to about 0.17 $g/in^3$ manganese, less than or equal to about 0.0035 $g/in^3$ iridium and greater than or equal to about 0.067 $g/in^3$. In specific embodiments, the promoter comprises tin in an amount up to about 0.2 $g/in^3$, indium in an amount up to about 0.2 $g/in^3$ and iridium in an amount up to about 0.01 $g/in^3$.

In one or more embodiments, the substrate comprises a wall flow monolith having a plurality of longitudinally extending passages formed by longitudinally extending walls bounding and defining said passages, the passages comprising inlet passages having an open inlet end and closed outlet end, and outlet passages having a closed inlet end and an open outlet end.

Additional embodiments are directed to methods of treating an exhaust gas stream emitted by a diesel engine. The exhaust gas stream is passed through a catalytic article comprising a first washcoat layer having a first platinum group metal comprising platinum impregnated on a promoted non-zeolite support. The promoter being selected from the group consisting of tin, manganese, indium, group VIII metal and combinations thereof.

Further embodiments of the invention are directed to exhaust treatment systems comprising a diesel engine and a diesel oxidation catalyst. The diesel oxidation catalyst is disposed downstream of and in flow communication with the diesel engine. The diesel oxidation catalyst comprises a substrate with a first washcoat layer disposed on the substrate. The first washcoat layer comprises a platinum group metal comprising platinum impregnated on a promoted non-zeolite support. The promoter being selected from the group consisting of tin, manganese, indium, group VIII metal and combinations thereof.

In some embodiments, the exhaust treatment system further comprises at least one additional catalyst located downstream of the engine, upstream of the diesel oxidation catalyst and in flow communication with both. In detailed embodiments, the exhaust treatment system further comprises at least one additional catalyst located downstream of and in flow communication with the diesel oxidation catalyst.

One or more embodiments of the invention are directed to methods of making a catalytic article. A non-zeolite support is impregnated with a platinum group metal comprising platinum. The promoted non-zeolite support having a promoter selected from the group consisting of tin, manganese, indium, group VIII metal and combinations thereof. Drying and calcining to fix the platinum group metal onto the promoted non-zeolite support. A washcoat slurry is formed comprising the calcined promoted non-zeolite support. A substrate is washcoated with the washcoat slurry.

DETAILED DESCRIPTION

Figure 1:
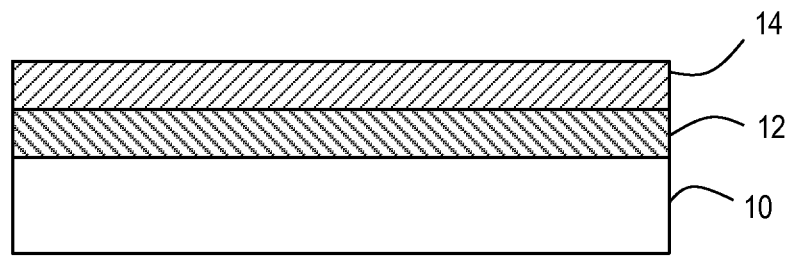
FIG. 1 shows a cross-section of a catalytic article according to one or more embodiments of the invention.

Before describing several exemplary embodiments of the invention, it is to be understood that the invention is not limited to the details of construction or process steps set forth in the following description. The invention is capable of other embodiments and of being practiced or being carried out in various ways.

As used in this specification and the appended claims, the singular forms "a", "an" and "the" include plural referents unless the context clearly indicates otherwise. Thus, for example, reference to "a catalyst" includes a mixture of two or more catalysts, and the like.

The following terms shall have, for the purposes of this application, the respective meanings set forth below.

"Lean gaseous streams" including lean exhaust streams mean gas streams that have a $\lambda>1.0$.

"Lean periods" refer to periods of exhaust treatment where the exhaust gas composition is lean, i.e., has a $\lambda>1.0$.

"Platinum group metal components" refer to platinum group metals or one of their oxides.

"Rare earth metal components" refer to one or more oxides of the lanthanum series defined in the Periodic Table of Elements, including lanthanum, cerium, praseodymium and neodymium.

"Rich gaseous streams" including rich exhaust streams mean gas streams that have a $\lambda<1.0$.

"Rich periods" refer to periods of exhaust treatment where the exhaust gas composition is rich, i.e., has a $\lambda<1.0$.

"Washcoat" has its usual meaning in the art of a thin, adherent coating of a catalytic or other material applied to a refractory substrate, such as a honeycomb flow through monolith substrate or a filter substrate, which is sufficiently porous to permit the passage there through of the gas stream being treated.

"Group VIII metals" are iron, cobalt, nickel, ruthenium, rhodium, palladium, osmium, iridium and platinum.

In an oxidation catalyst, unburned gaseous and non-volatile hydrocarbons (i.e., the SOF) and carbon monoxide are largely combusted to form carbon dioxide and water. In addition, a substantial proportion of the NO of the $NO_x$ component is oxidized to $NO_2$ in the oxidation catalyst. The increased proportion of $NO_2$ in the $NO_x$ due to the catalytic action of the oxidation catalyst facilitates the reduction of the $NO_x$ for the catalytic components that follow the DOC, such as CSF and SCR, as compared to exhaust streams containing smaller proportions of $NO_2$ in the $NO_x$ component.

The oxidation catalyst can be formed from any composition that provides effective combustion of unburned gaseous and non-volatile hydrocarbons (i.e., the SOF) and carbon monoxide. In addition, the oxidation catalyst should be effective to convert a substantial proportion of the NO of the $NO_x$ component to $NO_2$. As used herein, the term "substantial conversion of NO of the $NO_x$ component to $NO_2$" means a conversion of NO to $NO_2$ of at least about 5% or at least about 10% or at least about 20%, and specifically of at least about 30% over the driving cycle. The catalyst compositions can be coated onto honeycomb flow-through monolith substrates formed of refractory metallic or ceramic (e.g., cordierite) materials. Alternatively, oxidation catalysts may be formed on to metallic or ceramic foam substrates which are well-known in the art. These oxidation catalysts, by virtue of the substrate on which they are coated (e.g., open cell ceramic foam), and/or by virtue of their intrinsic oxidation catalytic activity provide some level of particulate removal.

Figure 2:
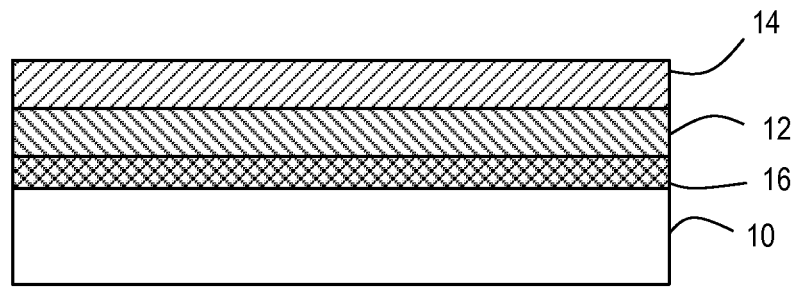
FIG. 2 shows a cross-section of a catalytic article according to one or more embodiments of the invention.

Based on laboratory light-off reactor and engine dyno testing, tin and manganese incorporated diesel oxidation catalysts offer superior light-off properties compared with those of reference catalysts. FIGS. 1 and 2 show cross-sectional examples of catalytic articles according to various embodiments of the invention. One or more embodiments of the invention are directed to catalytic articles comprising a substrate 10 having a first washcoat layer 12 comprising a first platinum group metal impregnated on a promoted non-zeolite support. In detailed embodiments, the non-zeolite support is promoted with a promoter selected from the group consisting of tin, manganese, group VIII metals and combinations thereof.

The promoter in the non-zeolite support can be present at suitable concentrations. In detailed embodiments, the promoter is present in an amount up to about 10% by weight of the support. In specific embodiments, the promoter is present in an amount up to and including about 50% by weight of the support. In various embodiments, the promoter is present in an amount up to and including about 1%, 2%, 3%, 4%, 6%, 7%, 8%, 9%, 11%, 12%, 13%, 14%, 15%, 20%, 25%, 30%, 35%, 40% or 45%. In specific embodiments, the promoter is in solid solution with the non-zeolite support.

The first washcoat layer 12 support can be any suitable support as described further below. In specific embodiments, the promoted support is a non-zeolitic material. In detailed embodiments, the non-zeolitic material is selected from the group consisting of aluminum compounds (e.g., alumina), zirconium compounds (e.g., zirconia), cerium compounds (e.g., ceria), zeolites, silicon compounds (e.g., silica), titanium compounds (e.g., titania), base metal oxides and combinations thereof. In specific embodiments, the first washcoat layer 12 support is alumina. In some embodiments, the first washcoat layer 12 support further comprises a zeolite. In detailed embodiments, the zeolite is a beta-zeolite. In other embodiments, the first washcoat layer 12 is substantially free of zeolites. As used in this specification and the appended claims, the term "substantially free of zeolites" means that there is less than about 5% zeolite by weight in the support.

According to some embodiments, the first washcoat layer 12 support is promoted with a material that decreases the CO and hydrocarbon light off temperature, and increases the $NO_2$ production. In detailed embodiments, the support is promoted with one or more of tin, manganese and indium. In specific embodiments, the support is promoted with tin. In other specific embodiments, the support is promoted with manganese. In the third specific embodiments, the support is promoted with indium and tin. In the yet another specific embodiment, the support is promoted with indium and manganese.

In detailed embodiments, the platinum group metal comprises platinum. In specific embodiments, the platinum group metal comprises a mixture of platinum and palladium. In some embodiments, the first washcoat layer 12 has a first platinum group metal loading in the range of about 5 g/ft³ to about 150 g/ft³. In various embodiments, the first platinum group metal has a loading in the range of about 50 g/ft³ to about 100 g/ft³, or in the range of about 70 g/ft³ to about 80 g/ft³, or about 72 g/ft³. In specific embodiments, the first platinum group metal is not solely palladium.

Platinum group metal-based compositions suitable for use in forming the oxidation catalyst are also described in U.S. Pat. No. 5,100,632 (the '632 patent) hereby incorporated by reference. The '632 patent describes compositions that have a mixture of platinum, palladium, rhodium, and ruthenium and an alkaline earth metal oxide such as magnesium oxide, calcium oxide, strontium oxide, or barium oxide with an atomic ratio between the platinum group metal and the alkaline earth metal of about 1:250 to about 1:1, and preferably about 1:60 to about 1:6.

Catalyst compositions suitable for the oxidation catalyst may also be formed using base metals as catalytic agents. For example, U.S. Pat. No. 5,491,120 (the disclosure of which is hereby incorporated by reference) discloses oxidation catalyst compositions that include a catalytic material having a BET surface area of at least about 10 m²/g and consist essentially of a bulk second metal oxide which may be one or more of titania, zirconia, ceria-zirconia, silica, alumina-silica, and alpha-alumina.

Some embodiments further comprise a second washcoat layer 14 comprising a second platinum group metal on a support. In specific embodiments, the second washcoat layer has a platinum group metal loading in the range of about 25 g/in³ to about 150 g/ft³. In more specific embodiments, the platinum group metal has a loading in the range of about 50 g/ft³ to about 110 g/ft³, or in the range of about 70 g/ft³ to about 90 g/ft³, or about 80 g/ft³. The second platinum group metal of specific embodiments comprises platinum, palladium or mixtures of platinum and palladium.

In one or more embodiments, the amount of the second platinum group metal is present in an amount less than or equal to about 25% of the total platinum group metal concentration. In detailed embodiments, the second platinum group metal is present in an amount less than or equal to about 20%. In specific embodiments, the amount of the second platinum group metal is present in an amount less than or equal to about 10% of the total platinum group metal concentration.

Some embodiments have a second washcoat layer 14 further comprising zeolite. In detailed embodiments, one or more of the first washcoat layer 12 and the second washcoat layer 14 further comprises a zeolite. In specific embodiments, the second washcoat layer 14 is substantially free of zeolite. In one or more embodiments, both the first washcoat layer 12 and the second washcoat layer 14 are substantially free of zeolite.

In the embodiment shown in FIG. 2, the catalytic article further comprises an undercoat washcoat layer 16. The undercoat washcoat layer 16 can include a zeolite or non-zeolitic material. The loading of the undercoat washcoat layer 16 of specific embodiments is in the range of about 0.2 g/in³ to about 5 g/in³. In more specific embodiments, the loading is in the range of about 0.5 g/in³ to about 4 g/in³, or in the range of about 0.7 g/in³ to about 3 g/in³, or in the range of about 0.8 g/in³ to about 2 g/in³, or in the range of about 0.9 g/in³ to about 1.5 g/in³, or about 1 g/in³.

In detailed embodiments, the undercoat washcoat layer 16 includes substantially no platinum group metal and is positioned between the substrate 10 and the first washcoat layer 12. As used in this specification and the appended claims, the term "substantially no platinum group metal" means than platinum group metals are not intentionally added to the undercoat washcoat layer 16 at a concentration greater than about 1 g/ft³. Additionally, "substantially no platinum group metal" excludes platinum group metals which may migrate into the layer through diffusion processes from adjacent materials or layers.

Additional embodiments have the promoted non-zeolite support further promoted with indium and iridium. In detailed embodiments, the promoter comprises manganese in an amount up to about 1 g/in³, iridium in an amount up to about 0.01 g/in³ and indium in an amount up to about 0.2 g/in³. In specific embodiments, the promoter comprise less than or equal to about 0.17 g/in³ manganese, less than or equal to about 0.0035 g/in³ iridium and greater than or equal to about 0.067 g/in³. In some embodiments, the promoter comprises tin an amount up to about 0.2 g/in³, indium in an amount up to about 0.2 g/in³ and iridium in an amount up to about 0.01 g/in³.

Substrates

The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 600 or more gas inlet openings (i.e., cells) per square inch of cross section.

Figure 3:
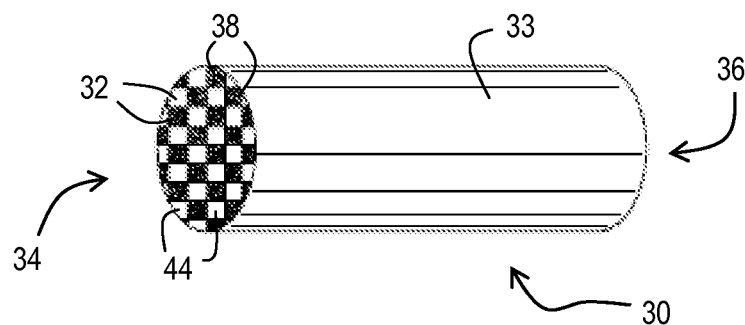
FIG. 3 shows a perspective view of a wall flow filter substrate.
Figure 4:
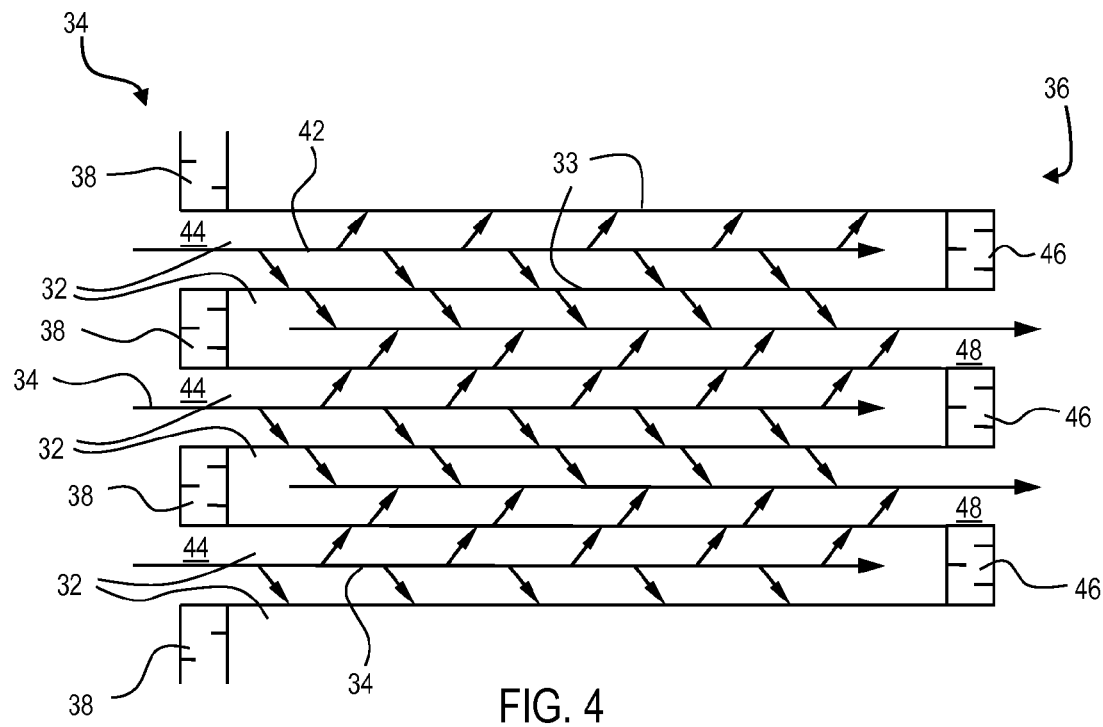
FIG. 4 shows a cutaway view of a section of a wall flow filter substrate.

FIGS. 3 and 4 illustrate a wall flow filter substrate 30 which has a plurality of passages 32. The passages are tubularly enclosed by the internal walls 33 of the filter substrate. The substrate has an inlet end 34 and an outlet end 36. Alternate passages are plugged at the inlet end with inlet plugs 38, and at the outlet end with outlet plugs 40 to form opposing checkerboard patterns at the inlet 34 and outlet 36. A gas stream 42 enters through the unplugged channel inlet 44, is stopped by outlet plug 46 and diffuses through channel walls 33 (which are porous) to the outlet side 48. The gas cannot pass back to the inlet side of walls because of inlet plugs 38.

Wall flow substrates for use in the inventive system can include thin porous walled honeycombs (monoliths) through which the fluid stream passes without causing too great an increase in back pressure or pressure across the article. Ceramic wall flow substrates used in the system can be formed of a material having a porosity of at least 40% (e.g., from 40 to 75%) having a mean pore size of at least 10 microns (e.g., from 10 to 30 microns).

In specific embodiments where extra functionality is applied, the substrates can have a porosity of at least 59% and have a mean pore size of between 10 and 20 microns. When substrates with these porosities and these mean pore sizes are coated with the techniques described below, adequate levels of desired catalyst compositions can be loaded onto the substrates. These substrates are still able retain adequate exhaust flow characteristics, i.e., acceptable back pressures, despite the catalyst loading. U.S. Pat. No. 4,329,162 is herein incorporated by reference with respect to the disclosure of suitable wall flow substrates.

Typical wall flow filters in commercial use are typically formed with lower wall porosities, e.g., from about 42% to 50%. In general, the pore size distribution of commercial wall flow filters is typically very broad with a mean pore size smaller than 25 microns.

The porous wall flow filter can be catalyzed in that the wall of the element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more washcoats of catalytic materials and combinations of one or more washcoats of catalytic materials on the inlet and/or outlet walls of the element. The filter may be coated by any of a variety of means well known to the art.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

Wall flow filter substrates (also referred to as wall flow monoliths) and wall flow substrates, are composed of ceramic-like materials such as cordierite, α-alumina, silicon carbide, aluminum titanate, silicon nitride, zirconia, mullite, spodumene, alumina-silica-magnesia or zirconium silicate, or of porous, refractory metal. Wall flow substrates may also be formed of ceramic fiber composite materials. The wall flow monolith of other embodiments is one or more of aluminum titanate, cordierite, silicon carbide, metal oxides and ceramics. Specific wall flow substrates are formed from cordierite, silicon carbide, and aluminum titanate. Such materials are able to withstand the environment, particularly high temperatures, encountered in treating the exhaust streams.

In alternative embodiments, one or all of the catalyst compositions may be deposited on an open cell foam substrate. Such substrates are well known in the art, and are typically formed of refractory ceramic or metallic materials.

Coating of the wall flow substrates with catalyst composition is achieved by immersing the substrates vertically in a portion of the catalyst slurry such that the second of the substrate is located just above the surface of the slurry. In this manner, slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300° C. to 450° C.). After calcining, the catalyst loading can determined be through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

The catalyst is dispersed on a suitable support material such as a refractory oxide with high surface area and good thermal stability such as a high surface area aluminum oxide. Also, aluminas stabilized with a second oxide are suitable supports. Lanthana stabilization of alumina provides a suitable support for precious group metal catalysts. Also, mixtures of aluminas are suitable supports. Other aluminas that are doped or treated with oxides such as $SiO_2$, $ZrO_2$, $TiO_2$, etc. to provide stabilization or improved surface chemistries can also be utilized. Other suitable support materials include, but are not limited to, $ZrO_2$ and $TiO_2$, can be used. In addition to the support oxides discussed above, it might prove useful to include other catalytically functional oxides to incorporate into the catalytic zone. Examples of these include $CeO_2$, $Pr_6O_{11}$, $V_2O_5$, and $MnO_2$ and combinations thereof and solid solution oxide mixtures, etc. These oxides can contribute to burning of hydrocarbons, especially heavy fuel derived hydrocarbons, and deposited coke/soot derived from disproportination (i.e., dehydrogenation or oxidative dehydrogenation) of the injected fuel and in this way give additional combustion activity to the catalytic zone, plus prevent deactivation of the PGM by the deposition hydrocarbon derived coke.

Emissions Treatment Methods and Systems

Additional embodiments, of the invention are directed to methods of treating an exhaust gas stream emitted by a diesel engine where the exhaust gas stream includes soot, carbon monoxide and hydrocarbons. The methods comprise passing the exhaust gas stream through a catalytic article as described herein.

Figure 5:
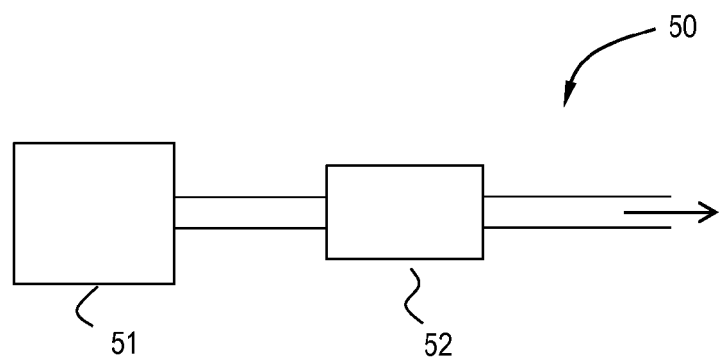
FIG. 5 shows a schematic depiction of an embodiment of an emission treatment system.

One embodiment of an emission treatment system 50 is schematically depicted in FIG. 5. The exhaust containing gaseous pollutants (including unburned hydrocarbons, carbon monoxide and NOx) and particulate matter is conveyed from the engine 51 to an oxidation catalyst 52 with a structure as described herein. In the oxidation catalyst 52, unburned gaseous and non-volatile hydrocarbons (i.e., the SOF) and carbon monoxide are largely combusted to form carbon dioxide and water.

Figure 6:
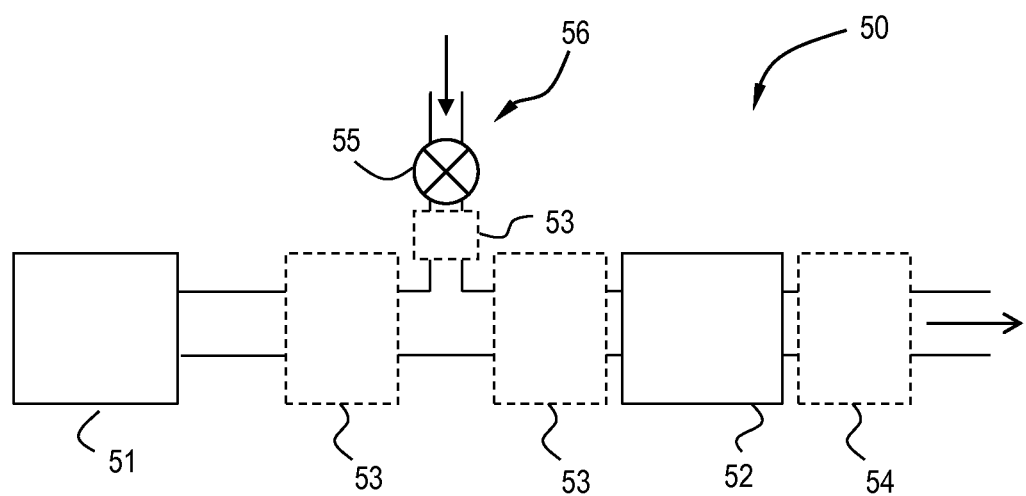
FIG. 6 shows a schematic depiction of an embodiment of an emission treatment system.

Other embodiments of the emission treatment system are shown in FIG. 6. In one or more embodiments, the emissions treatment system further comprises at least on additional catalyst 53 located downstream of the engine, and upstream of the diesel oxidation catalyst 52 and in flow communication with both. The additional catalyst can be one or more parts of a soot filter (catalyzed or uncatalyzed), an ammonia oxidation catalyst, an SCR catalyst.

In various embodiments, the system can further comprises one or more additional catalysts 54 located downstream of and in flow communication with the diesel oxidation catalyst 52. The additional catalyst can be any suitable catalyst. In specific embodiments the additional catalyst 54 is a soot filter. In these embodiments, removal of substantial proportions of the SOF using the oxidation catalyst 52, in particular, helps prevent too great a deposition of particulate matter on a soot filter (i.e., clogging), which may be positioned downstream in the system in some embodiments. In addition, a substantial proportion of the NO of the NOx component is oxidized to $NO_2$ in the oxidation catalyst 52.

Some embodiments may also include reductant or air injectors 56 which are capable of adding fuel or oxygen to the exhaust gas stream. The injector 56 may also include a metering device 55 which allows control of the amount of reductant or air injected.

EXAMPLES

The following preparations show, generically, the procedure employed to prepare samples according to various embodiments of the invention. It will be understood by those skilled in the art that the amounts of the individual ingredients can be adjusted to result in catalytic articles with varying performance characteristics.

Preparation of the Under Coat

A low surface area alumina (with a surface area less than about 100 $m^2/g$) was added to an opportune amount of water and acetic acid to obtain a solution with a solid content of about 44% and a pH of less then 3.2. The mixture was then milled at a constant temperature between about 15 and about 25° C. to obtain a final slurry with a $D_{90}$ of about 14 μm. Water was added to achieve a final solid content in the slurry of about 43% by weight. A monolithic substrate was coated with the slurry to a loading of about 1.0 $g/in^3$ after drying. The coated monolith was calcined at about 450° C.

Preparation of the First Coat

About 80% of the pore volume of an alumina was impregnated with a Pd solution and stirred for about 15 minutes. The Pd amount was chosen to have a final concentration after coating of about 40 $g/ft^3$. A barium hydroxide powder was mixed with the impregnated alumina support. Water was added to fill the remaining 20% of the pore volume and the resulting powder stirred for about 15 minutes.

The impregnated alumina powder was mixed with an amount of water and a Pt solution was added to the mixture. The amount of Pt was chosen to have a final concentration after coating of about 72 $g/ft^3$. The pH was adjusted with tartaric acid and nitric acid to obtain a solution with a total solid content of about 37% by weight and a pH of about 4. The slurry was then milled at constant temperature between about 15 and about 25° C. to reduce the particle size to a $D_{90}$ of about 16 μm. Water was added to the milled slurry to lower the solids content to about 35% by weight and sugar equal to about 6% of the amount of alumina was added.

The monoliths previously coated with the undercoat were coated with the first coat slurry to obtain a total loading of about 2.6 $g/in^3$ after drying. The coated monoliths were calcined at about 450° C.

In order to prepare the tin and manganese doped first coat slurries, alumina containing about 5% by weight tin or manganese was used instead of the alumina. No other process parameters were changed.

Preparation of the Second Coat

Porous alumina having a surface area in the range of about 100 $m^2/g$ to about 200 $m^2/g$ and acetic acid were mixed with water in order to have a solution with a solid content of about 40% by weight, a pH between about 3.8 and about 4.5 and a viscosity below about 200 cP. The solution was milled to reduce the particle size to a $D_{90}$ of about 20 μm at a constant temperature between about 15 and about 25° C.

Water and a Pt containing solutions were added to premilled H-Beta zeolite and mixed for 30 minutes. The amount of Pt was chosen to have a global Pt concentration after coating of about 80 $g/ft^3$. The target solid content for such Zeolite pre-slurry was about 40% by weight.

The alumina frit and the Zeolite pre-slurry were mixed together and the pH adjusted with acetic acid to a value between about 3.8 and about 4.2. Water and a colloidal alumina binder were added to the mixture to obtain a slurry with solid content of about 35% and a pH between about 3.0 and about 4.2. The slurry was then milled at constant temperature between about 15 and about 25° C. in order to reduce the particle size to a $D_{90}$ of about 15 μm. Water and an opportune amount of sugar equal to about 3% of the dry solid content were added to the milled slurry to obtain a final solution with a solid content of about 32% by weight.

The monolith previously coated with the undercoat and first coat were coated with the second coat slurry to have a total loading of about 3.3 g/in³ after drying. The coated monoliths were then calcined at about 450° C.

Promoted Sample Preparations

Samples were prepared similarly to the generic description above with varying amounts of one or more of indium, iridium, manganese and tin. The samples were tested in a laboratory reactor.

Table 1 includes a list of samples including various amounts of indium, iridium and manganese. The samples were prepared in accordance with the generic preparation described. Each of the samples includes a platinum group metal loading of about 30 g/ft³ with a platinum to palladium ratio of 10:1.

TABLE 1

| Sample | In    | Ir    | Mn    | Total Loading |
|--------|-------|-------|-------|---------------|
| Ref    | 0     | 0     | 0     | 2.079         |
| 1      | 0.100 | 0.000 | 0.000 | 2.179         |
| 2      | 0.000 | 0.010 | 0.000 | 2.089         |
| 3      | 0.000 | 0.000 | 1.000 | 3.079         |
| 4      | 0.050 | 0.005 | 0.000 | 2.134         |
| 5      | 0.050 | 0.000 | 0.500 | 2.629         |
| 6      | 0.000 | 0.005 | 0.500 | 2.584         |
| 7      | 0.033 | 0.003 | 0.333 | 2.449         |
| 8      | 0.067 | 0.002 | 0.167 | 2.314         |
| 9      | 0.017 | 0.007 | 0.167 | 2.269         |
| 10     | 0.017 | 0.002 | 0.667 | 2.764         |
| 11     | 0.100 | 0.000 | 0.000 | 2.179         |
| 12     | 0.000 | 0.000 | 1.000 | 3.079         |
| 13     | 0.000 | 0.010 | 0.000 | 2.089         |
| 14     | 0.000 | 0.005 | 0.500 | 2.584         |

Lab reactor studies were performed with a 1.5 inch by 3.0 inch sample from each composition in Table 1. The feed gas composition was 14% $O_2$, 4% $CO_2$, 5% $H_2O$, 1060 vppm CO, 33 vppm propylene, 30 vppm decame; 100 vppm NO. The space velocity was 50,000 $h^{-1}$. The temperature sweep comprised heating from about 80° C. to about 380° C. at about 10° C./min; holding for 10 minutes at about 380° C.; and cooling down from about 380° C. to about 80° C. at about 10° C./min.

Figure 7:
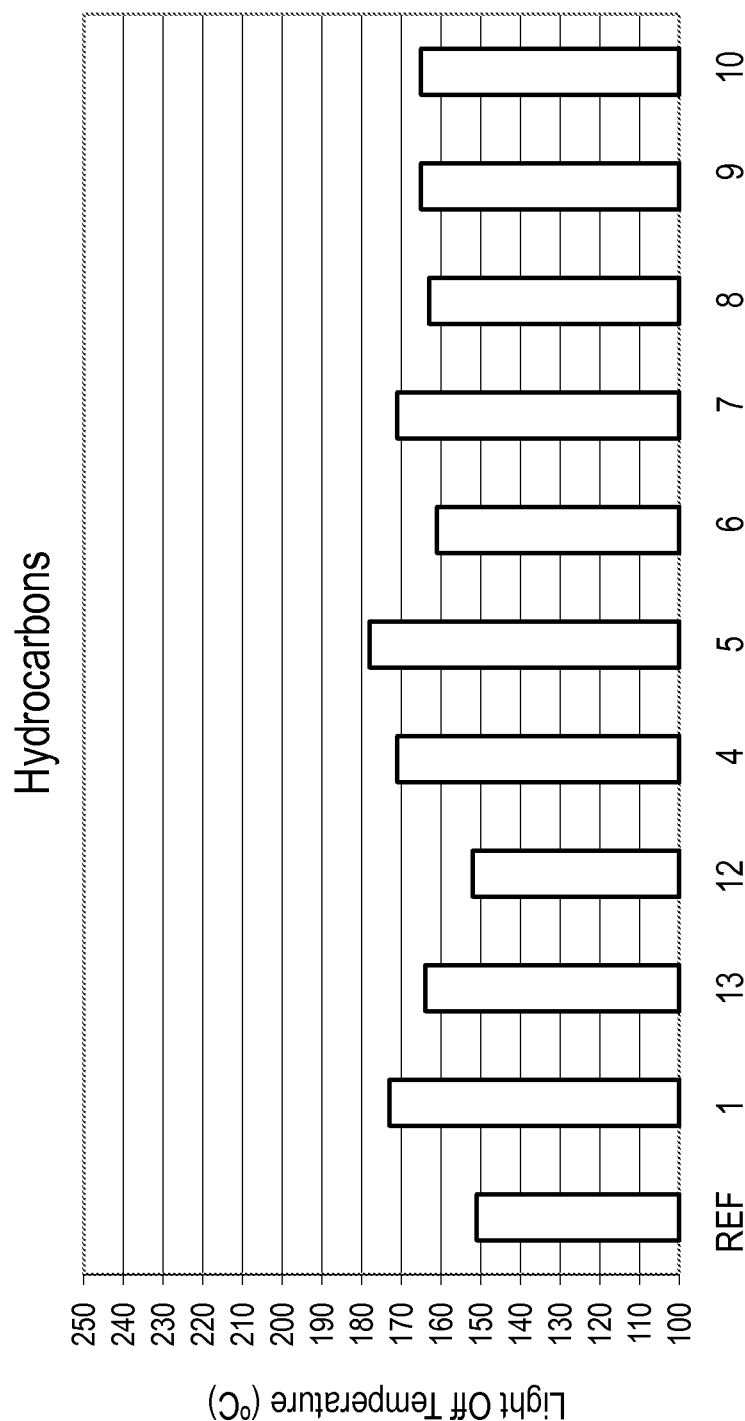
FIG. 7 shows the hydrocarbon light-off temperatures for various samples including one or more of manganese, iridum and indium in accordance with one or more embodiments of the invention.
Figure 8:
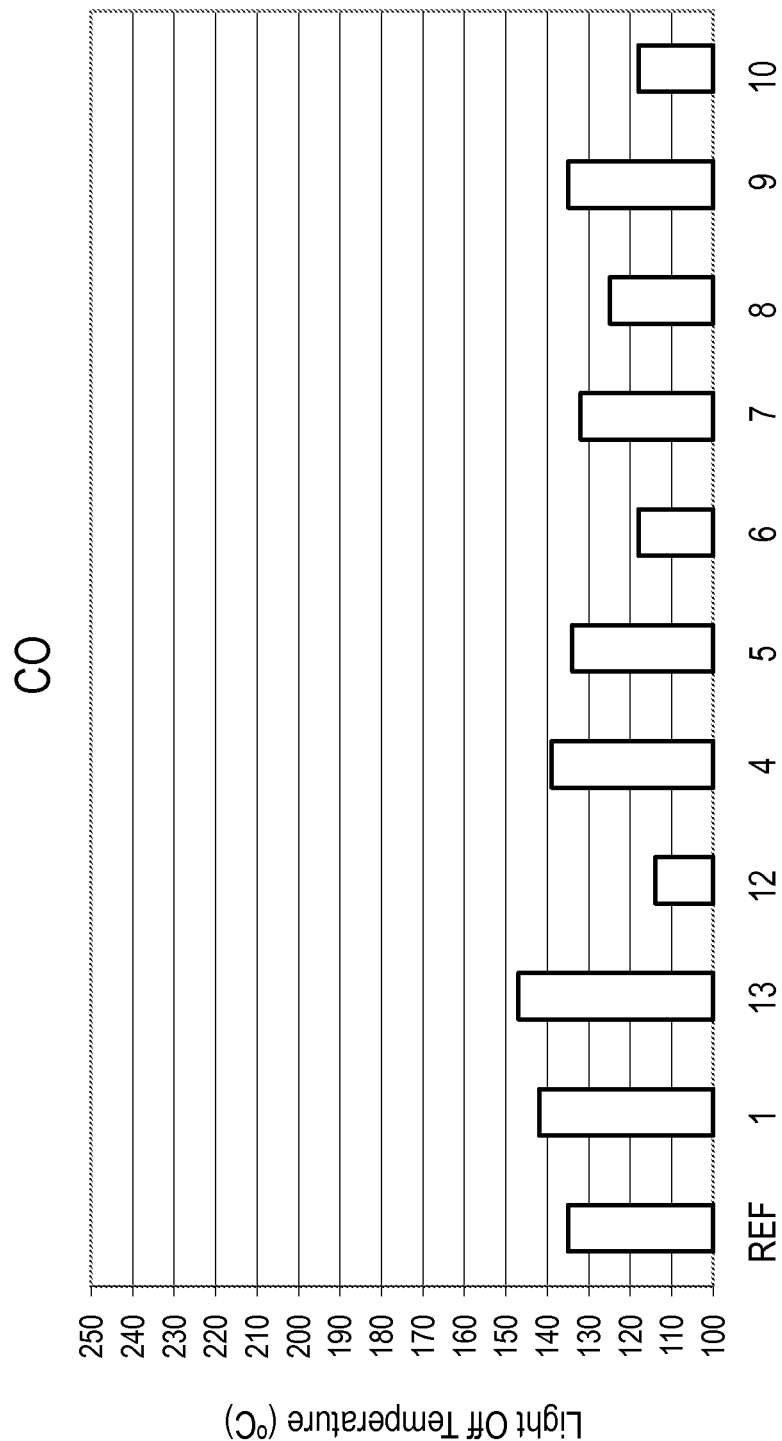
FIG. 8 shows the CO light-off temperatures for various samples including one or more of manganese, iridum and indium in accordance with one or more embodiments of the invention.

FIG. 7 shows the light-off temperatures for hydrocarbons for various samples from Table 1. Sample 12 showed a light-off temperature about the same as the reference sample, with each of the remaining samples being within about 27° C. of the reference. FIG. 8 shows the light-off temperature for carbon monoxide for various samples from Table 1. Most of the samples shown had light-off temperatures lower than that of the reference sample.

Figure 9:
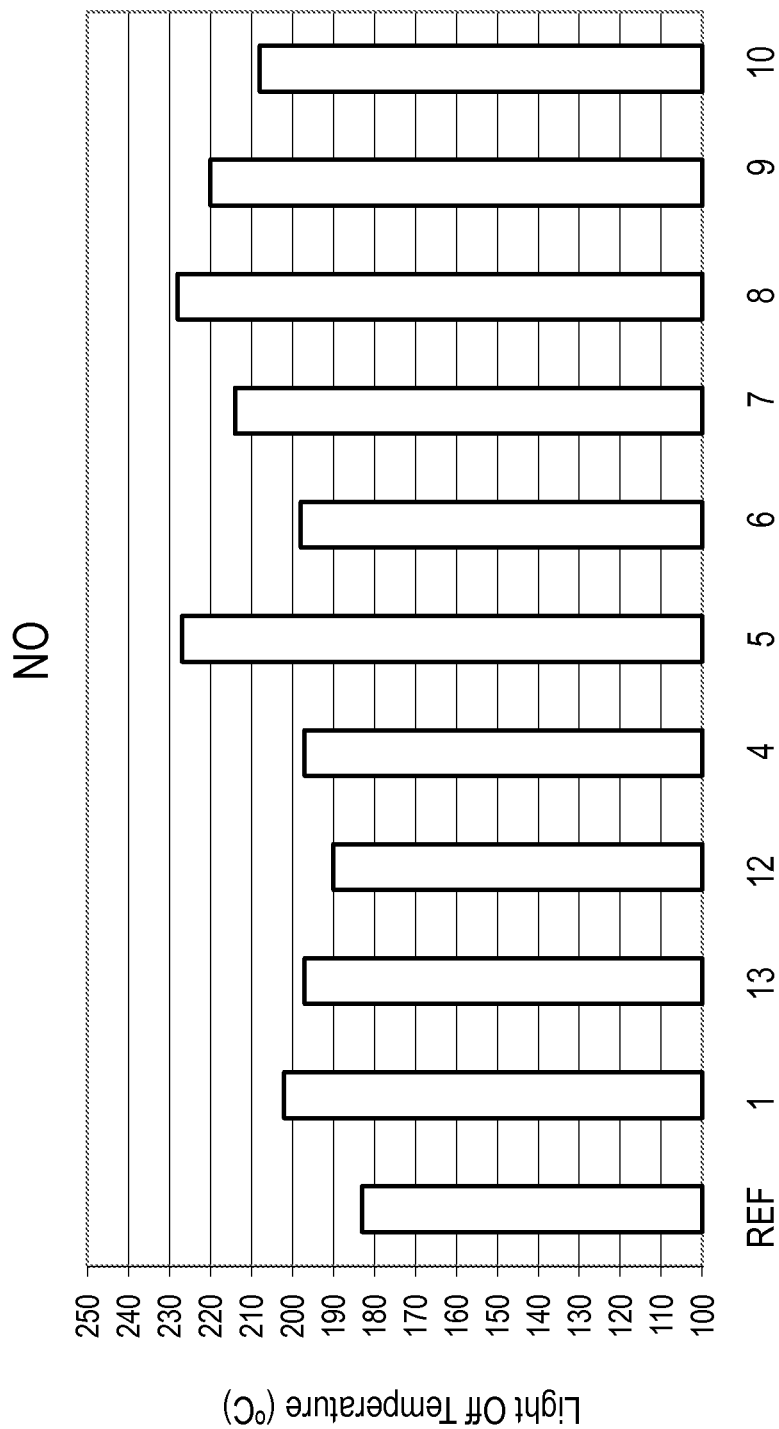
FIG. 9 shows the NO light-off temperatures for various samples including one or more of manganese, iridium and indium in accordance with one or more embodiments of the invention.
Figure 10:
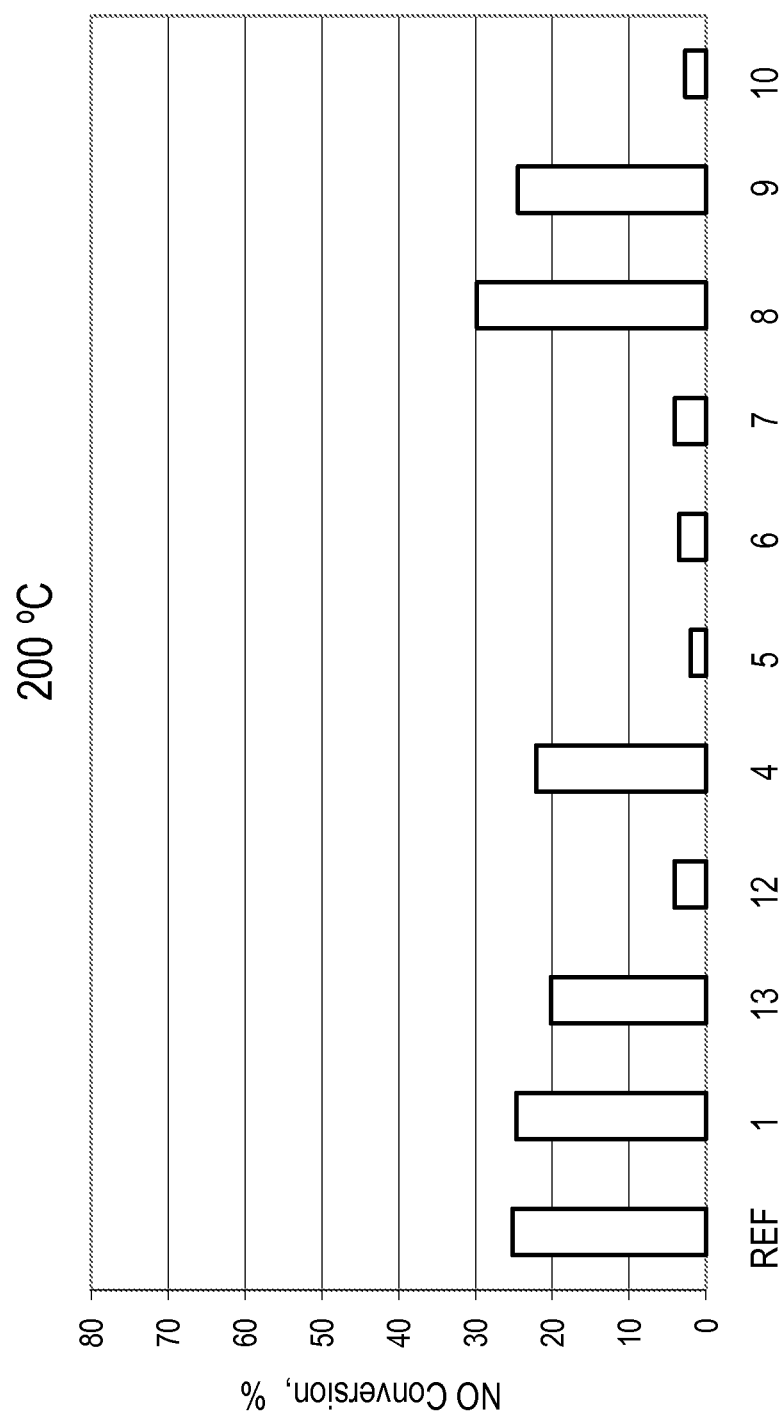
FIG. 10 shows the percent NO conversion at 200° C. for various samples including one or more of manganese, iridium and indium in accordance with one or more embodiments of the invention.
Figure 11:
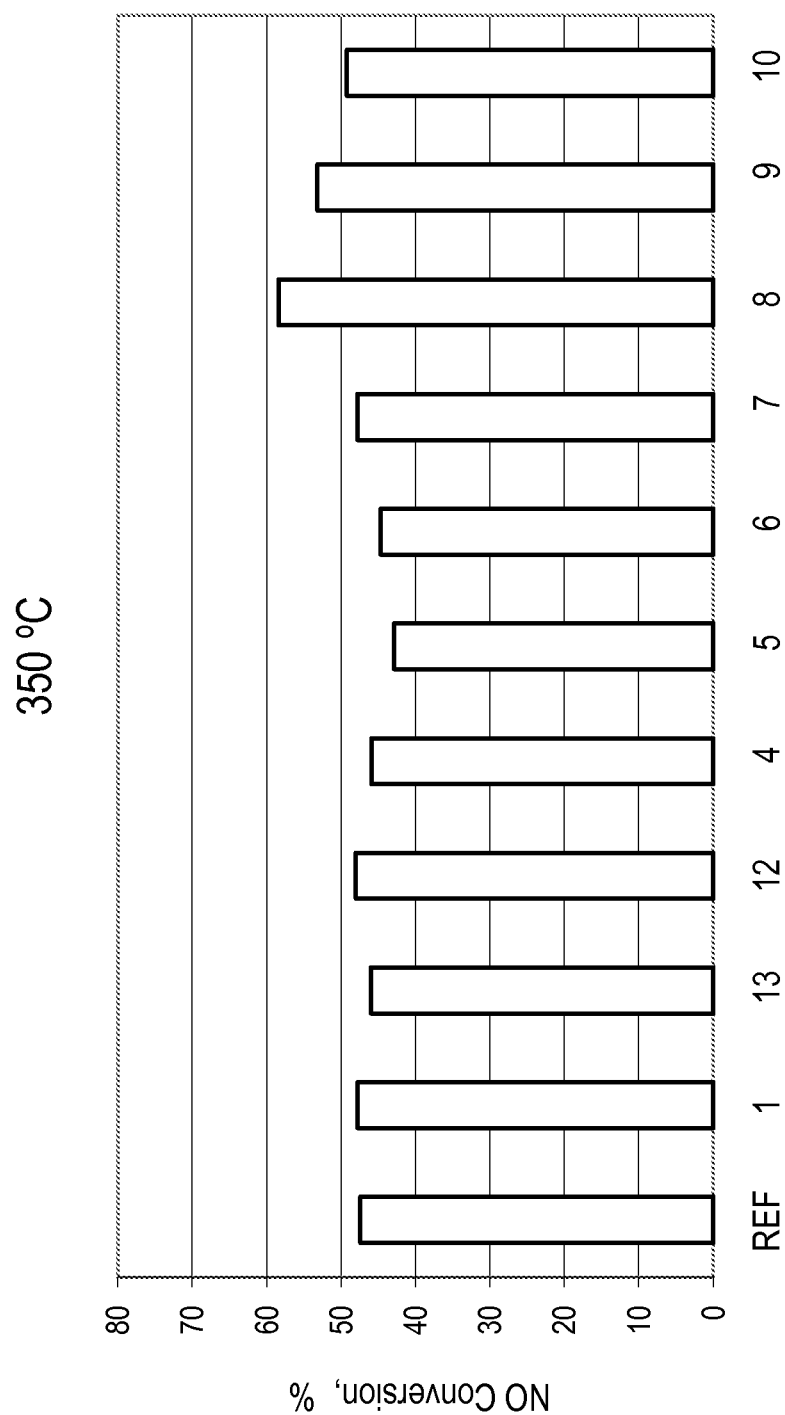
FIG. 11 shows the percent NO conversion at 350° C. for various samples including one or more of manganese, iridium and indium in accordance with one or more embodiments of the invention.

FIGS. 9 through 11 show light-off and conversion percentages for various samples from Table 1. FIG. 9 shows the light-off temperature for the samples shown in FIGS. 7 and 8. FIGS. 10 and 11 show the percent conversion of NO at 200° C. and 350° C., respectively. The samples shown in FIGS. 10 and 11 were aged in 10% steam at about 800° C. for 12 hours.

Table 2 includes a list of samples including various amounts of indium, iridium and tin. The samples were prepared in accordance with the generic preparation described above. Each of the samples includes a platinum group metal loading of about 30 g/ft³ with a platinum to palladium ratio of 10:1.

TABLE 2

| Sample | In    | Ir    | Sn    | Total Loading |
|--------|-------|-------|-------|---------------|
| Ref    | 0     | 0     | 0     | 2.079         |
| 15     | 0.200 | 0.000 | 0.000 | 2.279         |
| 16     | 0.100 | 0.005 | 0.000 | 2.184         |
| 17     | 0.100 | 0.000 | 0.010 | 2.189         |
| 18     | 0.033 | 0.007 | 0.003 | 2.122         |

Figure 12:
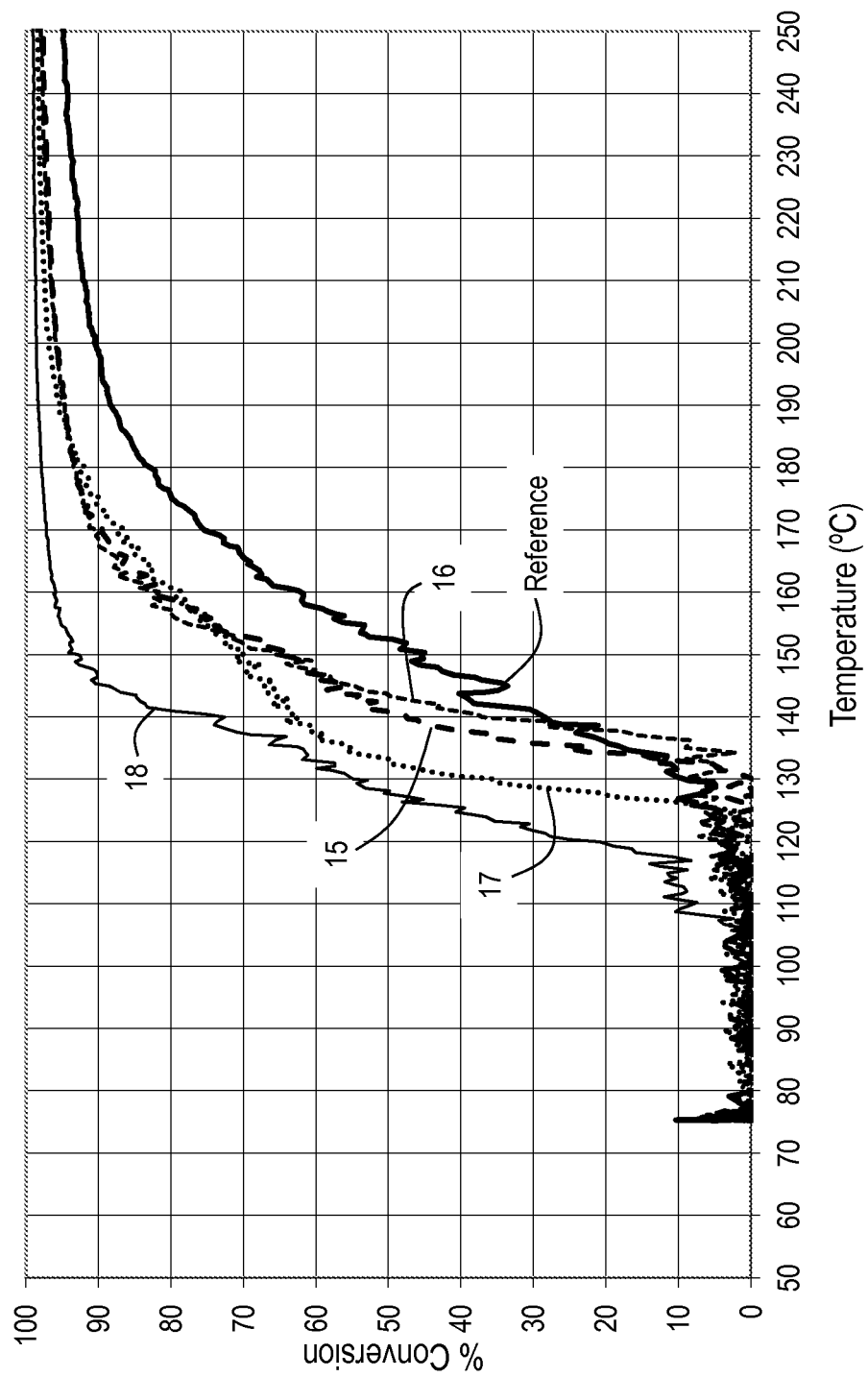
FIG. 12 shows the hydrocarbon conversion percentage as a function of temperature for freshly prepared samples including one or more of iridium, indium and tin in accordance with one or more embodiments of the invention.
Figure 13:
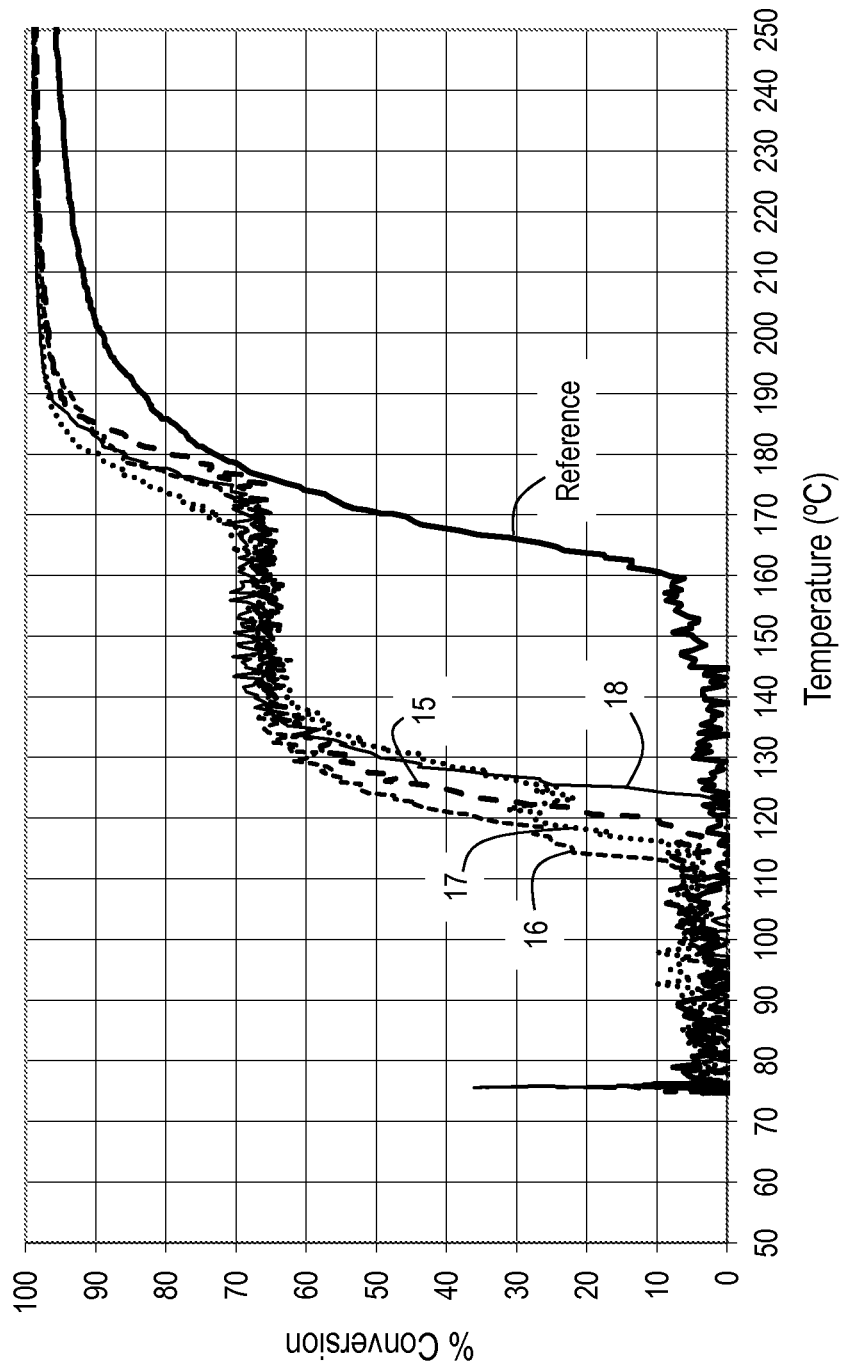
FIG. 13 shows the hydrocarbon conversion percentage as a function of temperature for the samples of FIG. 12 after aging in accordance with one or more embodiments of the invention.

Lab reactor studies were performed on the samples listed in Table 2 in accordance with the studies for those of Table 1. The results are presented in FIGS. 12 through 14. FIG. 12 shows the percent conversion of hydrocarbons as a function of temperature for fresh samples from Table 2. Each of the promoted samples showed a decrease in the light-off temperature (the temperature at which 50% conversion is achieved) for hydrocarbons compared to the reference sample. FIG. 13 shows the percent conversion of hydrocarbons after aging the samples at about 700° C. for about 10 hours in 10% steam in air. The promoted samples continued to show lower light-off temperatures than that of the reference sample.

Figure 14:
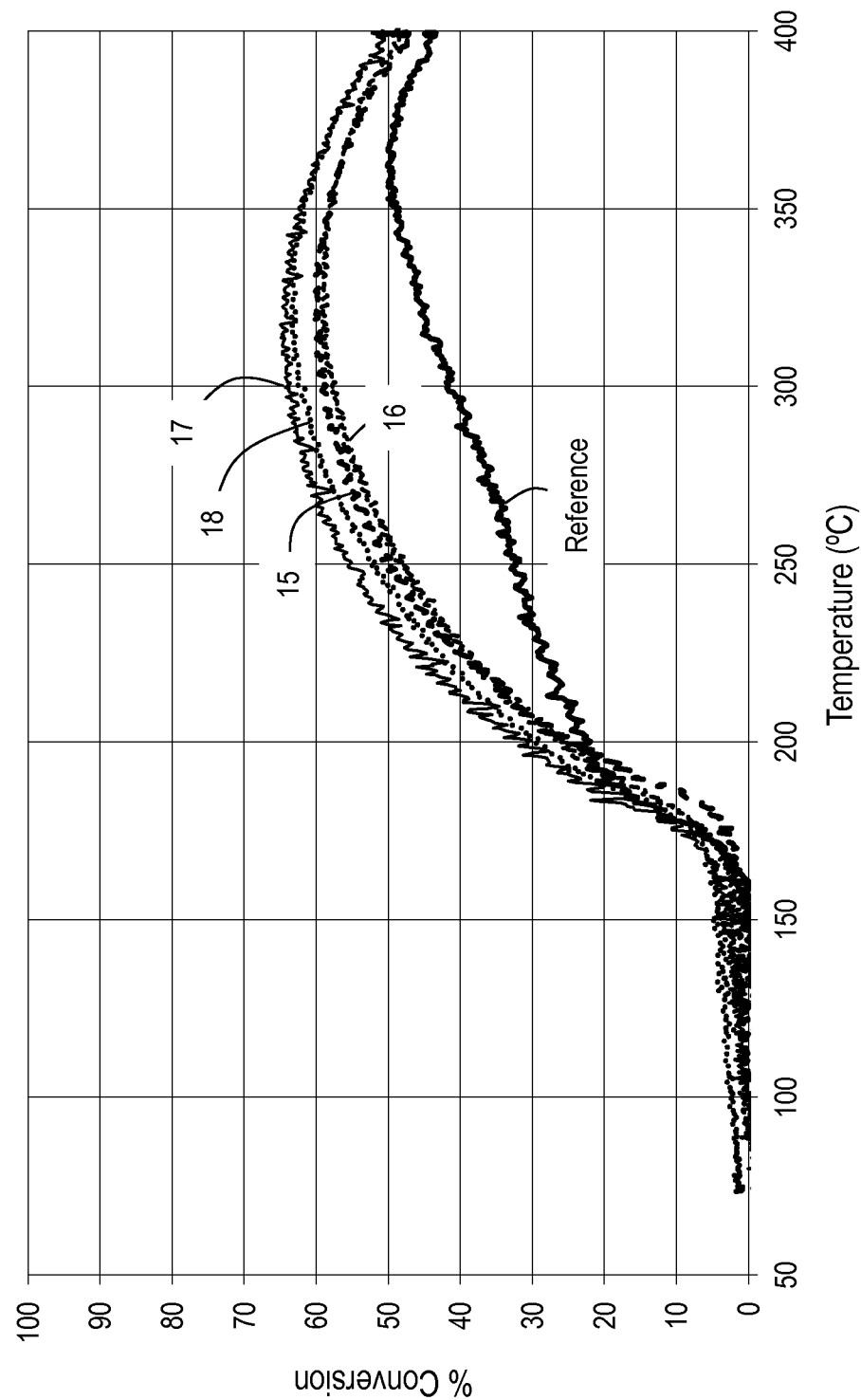
FIG. 14 shows the NO conversion percentage as a function of temperature for aged samples including one or more of iridium, indium and tin in accordance with one or more embodiments of the invention.

FIG. 14 shows a graph of the percent conversion of NO for aged samples from Table 2. The samples were aged at about 700° C. for about 10 hours in 10% steam in air. It can be seen from this graph that the promoted samples had a significantly higher conversion percentage than the reference sample.

Engine Samples 19-21

Samples for engine testing were prepared similarly to the previous samples. The preparation of the undercoat layer and the first coat were prepared in accordance with the above description. The monoliths used with these samples were generally cylindrical with a diameter about 5.66 inches and a length of about 3 inches. The monoliths had a cell density of about 400 cells per square inch. Each monolith was coated first with the undercoat layer and then with the first layer as described above.

The second coat was prepared by mixing porous alumina having a surface area in the range of about 100 m²/g to about 150 m²/g and acetic acid were mixed with water in order to have a solution with a solid content of about 44% by weight and a pH between about 3.8 and about 4.5. The solution was milled to reduce the particle size to a $D_{90}$ of about 20 μm at a constant temperature between about 15 and about 25° C.

Water and a Pt containing solutions were added to pre-milled H-Beta zeolite and mixed for 30 minutes. The amount of Pt was chosen to have a global Pt concentration after coating of about 120 g/ft³ with a Pt:Pd ratio of about 2:1. The target solid content for such Zeolite pre-slurry was about 40% by weight and a target pH in the range of about 3.8 to about 4.2.

The alumina frit and the Zeolite pre-slurry were mixed together and the pH adjusted with acetic acid to a value between about 3.0 and about 4.2. Water and a colloidal alumina binder were added to the mixture to obtain a slurry with solid content of about 35%. The slurry was then milled at constant temperature between about 15 and about 25° C. in order to reduce the particle size to a $D_{90}$ of about 15 μm. Water and an opportune amount of sugar were added to the milled slurry to obtain a final solution with a solids content of about 32% by weight and a target pH in the range of about 3.0 and about 4.2.

The monolith previously coated with the undercoat and first coat were coated with the second coat slurry to have a total loading of about 3.28 g/in$^3$ after drying. The coated monoliths were then calcined at about 450° C.

Promoted Sample Preparations

Samples were prepared similarly to the generic description above with about 5% by weight tin or manganese. Table 3 summarizes the samples which were tested on a 2.0 L engine.

TABLE 3

| Sample | Sn | Mn |
|---|---|---|
| 19 (Reference) | 0 | 0 |
| 20 | 5 | 0 |
| 21 | 0 | 5 |

Figure 15:
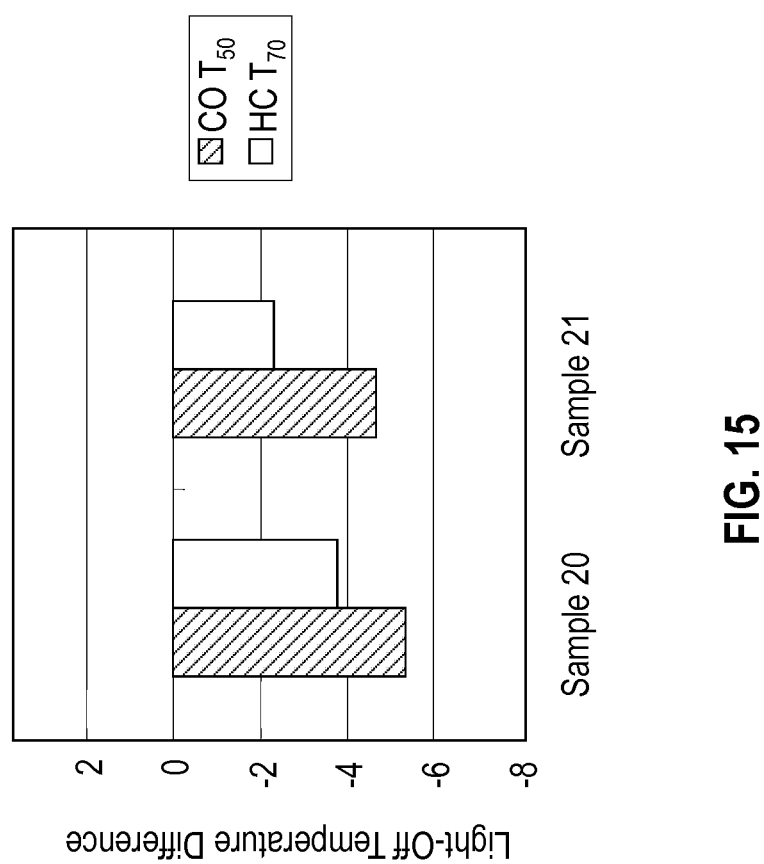
FIG. 15 shows the engine light-off temperature for carbon monoxide and hydrocarbons for samples made in accordance with one or more embodiments of the invention.

FIG. 15 shows a graph of the light-off temperature for carbon monoxide (measured at the 50% level) and hydrocarbons (measured at the 70% level). The light-off temperatures of Samples 20 and 21 were compared to the Reference Sample 19. A negative value indicates that the light-off temperatures were decreased relative to the Reference Sample 19.

Figure 16:
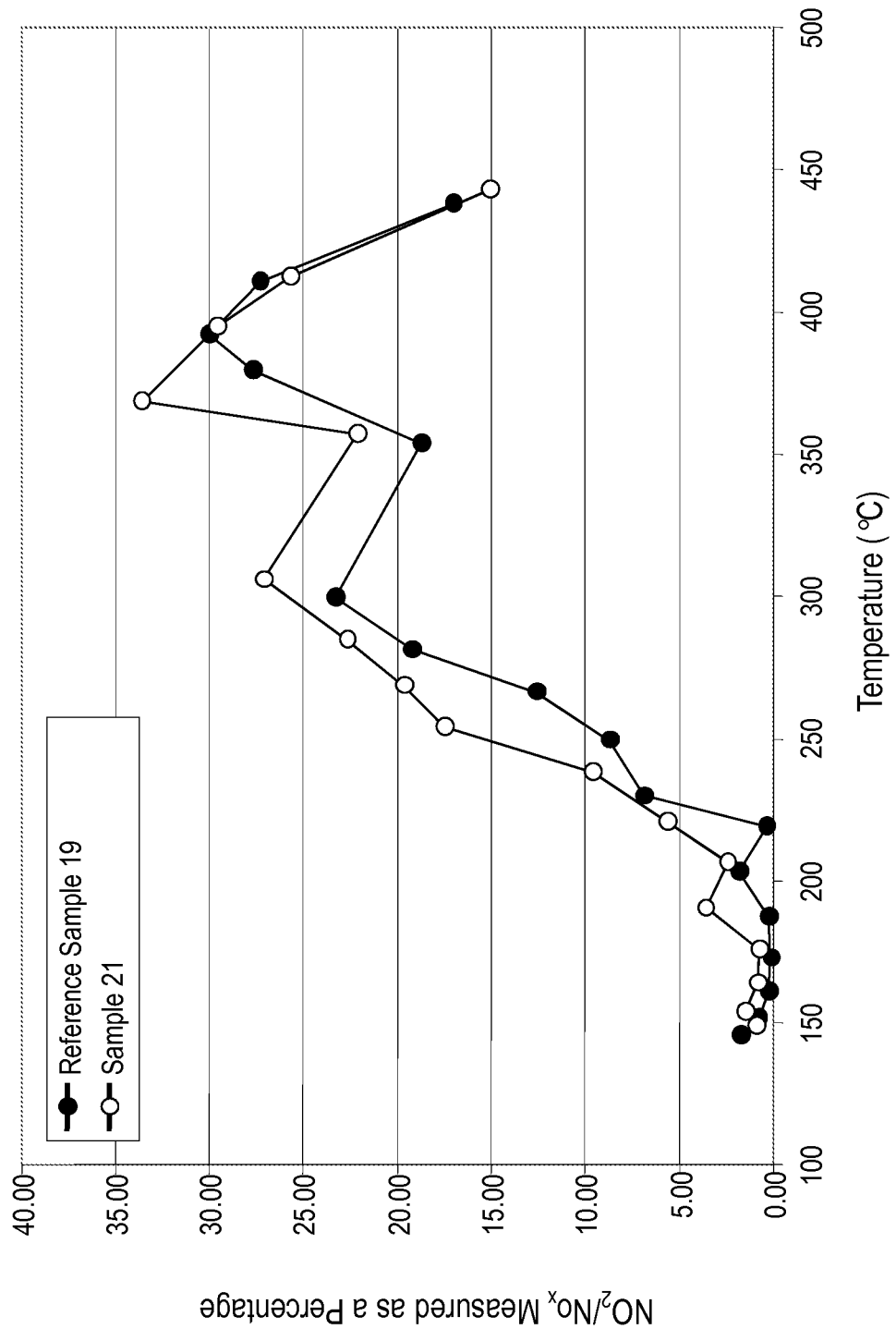
FIG. 16 shows the ratio of $NO_2/NOx$ as a function of temperature for samples made in accordance with one or more embodiments of the invention.

FIG. 16 shows a graph of the $NO_2/NO_x$ ratio (measured as a percentage) for the Reference Sample 19 and Sample 21 as a function of temperature. The higher $NO_2/NO_x$ ratio shown in the graph is better for SCR performance.

According to some detailed embodiments, the catalytic article has a lower CO light off temperature and hydrocarbon light off temperature after aging for 12 hours at 800° C. in 10% steam than a similarly prepared catalytic article without a promoter.

Reference throughout this specification to "one embodiment," "certain embodiments," "one or more embodiments" or "an embodiment", means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalytic article comprising a substrate having a first washcoat layer comprising a first platinum group metal comprising platinum impregnated on a non-zeolite support promoted with a promoter being selected from the group consisting of tin, manganese, indium, group VIII metal and combinations thereof, the catalytic article further comprising a second washcoat layer comprising a second platinum group metal on a support.

2. The catalytic article of claim 1, wherein less than or equal to about 10% of total platinum group metal is in the second washcoat layer.

3. The catalytic article of claim 1, wherein one or more of the first washcoat layer and the second washcoat layer further comprises a zeolite.

4. The catalytic article of claim 1, wherein both the first washcoat layer and the second washcoat layer are substantially free of zeolite.

5. The catalytic article of claim 1, wherein the promoter is present in an amount up to about 50% by weight.

6. The catalytic article of claim 1, wherein the promoted non-zeolite support is promoted with manganese, indium and iridium.

7. A catalytic article comprising a substrate having a first washcoat layer comprising a first platinum group metal comprising platinum impregnated on a non-zeolite support promoted with a promoter being selected from the group consisting of tin, manganese, indium, group VIII metal and combinations thereof, the catalytic article further comprising an undercoat washcoat layer comprising substantially no platinum group metal, the undercoat washcoat layer positioned between the substrate and the first washcoat layer.

8. A catalytic article comprising a substrate having a first washcoat layer comprising a first platinum group metal comprising platinum impregnated on a non-zeolite support promoted with a promoter being selected from the group consisting of tin, manganese, indium, group VIII metal and combinations thereof, wherein the promoter is in solid solution with the non-zeolite support.

9. A catalytic article comprising a substrate having a first washcoat layer comprising a first platinum group metal comprising platinum impregnated on a non-zeolite support promoted with a promoter being selected from the group consisting of tin, manganese, indium, group VIII metal and combinations thereof, wherein the non-zeolite support is alumina.

10. A catalytic article comprising a substrate having a first washcoat layer comprising a first platinum group metal comprising platinum impregnated on a non-zeolite support promoted with a promoter being selected from the group consisting of tin, manganese, indium, group VIII metal and combinations thereof, wherein the first platinum group metal comprises a mixture of platinum and palladium.

11. A catalytic article comprising a substrate having a first washcoat layer comprising a first platinum group metal comprising platinum impregnated on a non-zeolite support promoted with a promoter being selected from the group consisting of tin, manganese, indium, group VIII metal and combinations thereof, wherein the promoted non-zeolite support is promoted with a promoter comprising manganese and indium.

12. The catalytic article of claim 11, wherein the promoted non-zeolite support is promoted with a promoter comprising manganese.

13. A catalytic article comprising a substrate having a first washcoat layer comprising a first platinum group metal comprising platinum impregnated on a non-zeolite support promoted with a promoter being selected from the group consisting of tin, manganese, indium, group VIII metal and combinations thereof, wherein the promoter comprises manganese in an amount up to about 1 g/in$^3$, iridium in an amount up to about 0.01 g/in$^3$ and indium in an amount up to about 0.1 g/in$^3$.

14. A catalytic article comprising a substrate having a first washcoat layer comprising a first platinum group metal comprising platinum impregnated on a non-zeolite support promoted with a promoter being selected from the group consisting of tin, manganese, indium, group VIII metal and combinations thereof, wherein the promoter comprises less than or equal to about 0.17 g/in$^3$ manganese, less than or equal to about 0.0035 g/in$^3$ iridium and greater than or equal to about 0.067 g/in$^3$ indium.

15. A catalytic article comprising a substrate having a first washcoat layer comprising a first platinum group metal comprising platinum impregnated on a non-zeolite support promoted with a promoter being selected from the group consisting of tin, manganese, indium, group VIII metal and combinations thereof, wherein the promoter comprises tin in an amount up to about 0.2 g/in$^3$, indium in an amount up to about 0.2 g/in$^3$ and iridium in an amount up to about 0.01 g/in$^3$.

16. A catalytic article comprising a substrate having a first washcoat layer comprising a first platinum group metal comprising platinum impregnated on a non-zeolite support promoted with a promoter being selected from the group consisting of tin, manganese, indium, group VIII metal and combinations thereof, wherein the substrate comprises a wall flow monolith having a plurality of longitudinally extending passages formed by longitudinally extending walls bounding and defining said passages.

17. A method of treating an exhaust gas stream emitted by a diesel engine comprising passing the exhaust gas stream through a catalytic article comprising a substrate having a first washcoat layer comprising a first platinum group metal comprising platinum impregnated on a non-zeolite support promoted with a promoter being selected from the group consisting of tin, manganese, indium, group VIII metal and combinations thereof.

18. The method of claim 17, wherein the promoter is in solid solution with the non-zeolite support.

19. The method of claim 17, wherein the promoted non-zeolite support comprises manganese, indium and iridium.

20. An exhaust treatment system comprising:
a diesel engine; and
a diesel oxidation catalyst disposed downstream of and in flow communication with the diesel engine, the diesel oxidation catalyst comprising a substrate with a first washcoat layer disposed on the substrate, the first washcoat layer comprising a platinum group metal comprising platinum impregnated on a promoted non-zeolite support, the promoter being selected from the group consisting of tin, manganese, indium, group VIII metal and combinations thereof.

21. The exhaust treatment system of claim 20, wherein the promoter is in solid solution with the non-zeolite support.

22. The exhaust treatment system of claim 20, wherein the promoted non-zeolite support comprises manganese, indium and iridium.

23. The exhaust treatment system of claim 20, wherein the promoted non-zeolite support comprising manganese.

24. The exhaust treatment system of claim 20, further comprising at least one additional catalyst located downstream of the engine, upstream of the diesel oxidation catalyst and in flow communication with both.

25. The exhaust treatment system of claim 20, further comprising at least one additional catalyst located downstream of and in flow communication with the diesel oxidation catalyst.

26. A method of making a catalytic article comprising:
impregnating a promoted non-zeolite support with a platinum group metal comprising platinum, the promoted non-zeolite support having a promoter selected from the group consisting of tin, manganese, indium, group VIII metal and combinations thereof;
drying and calcining to fix the platinum group metal onto the promoted non-zeolite support;
forming a washcoat slurry comprising the calcined promoted non-zeolite support; and
washcoating a substrate with the washcoat slurry.

27. The method of claim 26, wherein the promoter is in solid-solution with the non-zeolite support.

28. The method of claim 26, wherein the promoter comprises manganese, indium and iridium.

29. The method of claim 26, wherein the promoter comprises tin, indium and iridium.

* * * * *